United States Patent
Mahamuni et al.

(10) Patent No.: US 9,703,555 B2
(45) Date of Patent: Jul. 11, 2017

(54) SYSTEM AND METHOD FOR ANALYZING SOFTWARE APPLICATION IN VIEW OF ENTRY POINTS

(71) Applicant: Tata Consultancy Services Limited, Maharashtra (IN)

(72) Inventors: Ravi Hanmant Mahamuni, Maharashtra (IN); Pragati Srivastava, Maharashtra (IN); Shrawan Kumar, Maharashtra (IN)

(73) Assignee: Tata Consultancy Services Limited, Maharashtra (IN)

( * ) Notice: Subject to any disclaimer, the term of this patent is extended or adjusted under 35 U.S.C. 154(b) by 100 days.

(21) Appl. No.: 14/183,940

(22) Filed: Feb. 19, 2014

(65) Prior Publication Data
US 2014/0298294 A1   Oct. 2, 2014

(30) Foreign Application Priority Data
Mar. 28, 2013 (IN) .......................... 1201/MUM/2013

(51) Int. Cl.
G06F 9/44 (2006.01)
G06F 9/45 (2006.01)
G06F 11/36 (2006.01)

(52) U.S. Cl.
CPC ................ G06F 8/75 (2013.01); G06F 8/433 (2013.01); G06F 11/3608 (2013.01)

(58) Field of Classification Search
CPC ......... G06F 8/75; G06F 11/3608; G06F 8/433
USPC ....................................................... 717/123
See application file for complete search history.

(56) References Cited

U.S. PATENT DOCUMENTS

| | | | |
|---|---|---|---|
| 6,817,014 B2 | 11/2004 | Hundt et al. | |
| 7,114,164 B2* | 9/2006 | Smith | G06F 9/524 714/38.13 |
| 7,530,057 B2* | 5/2009 | Babcock | 717/129 |
| 7,739,666 B2* | 6/2010 | Zhu et al. | 717/127 |
| 7,870,114 B2* | 1/2011 | Zhang et al. | 707/705 |
| 2004/0003312 A1* | 1/2004 | Smith | G06F 11/0715 714/38.13 |
| 2005/0125777 A1* | 6/2005 | Calder et al. | 717/131 |
| 2006/0218537 A1* | 9/2006 | Aroya | 717/130 |
| 2007/0011605 A1* | 1/2007 | Dumitru | G06F 17/30899 715/235 |
| 2012/0192161 A1 | 7/2012 | Pistoia et al. | |

OTHER PUBLICATIONS

Kalana Wijethunga, 'Main entry point of a C# program', Jan. 29, 2011.
Andrew Pociu, 'How do I create multiple entry points and specify which one to use?', Sep. 19, 2004.

* cited by examiner

Primary Examiner — John Chavis
(74) Attorney, Agent, or Firm — Hayes Soloway PC

(57) ABSTRACT

The present disclosure provides a system and method for performing an analysis of a software application in a computing environment. A receiving module accepts source code of the software application as input data and obtains a list of the entry points. Intermediate representation from the input data is generated in order to construct informative structure for the software application. Uncalled functions in the software application are identified and are considered as entry points. The entry points are wrapped into one entry point and analyzed maintaining calling context of all the entry points.

13 Claims, 7 Drawing Sheets

SYSTEM AND METHOD FOR ANALYZING SOFTWARE APPLICATION IN VIEW OF ENTRY POINTS

FIELD OF THE INVENTION

The present disclosure relates to a field of computer software application analysis. More particularly, the present disclosure relates to performing an analysis of entry points in a computing environment.

BACKGROUND OF THE INVENTION

Static analysis technique is used to find runtime errors, resource leaks and security vulnerabilities statically without executing the software application code. Static program analysis enables analysis of software applications performed without executing the software programs. Depending on the case, static program analysis is performed on specific source code or object code.

Entry points are interfacing functions or entry functions that help in executing the functionality of the software application. The software application may have multiple entry points to the application. The entry points may be called either in sequence or concurrently. Entry points are required for the analysis of certain functionalities of the software application and to validate the software application exposure.

Any software application may be analyzed in order to identify runtime defects with respect to standards set based on static analysis tool. In certain scenarios, when there are multiple entry points in the software application, each and every entry point is analyzed as a separate task in which multiple tasks are run in parallel. Analyzing the application by running each and every entry point as separate task is time consuming process. In the case where each of the entry points are to be reviewed, review points or defects for all the entry points are vast and the entry points might comprise duplicate review points which are similar to one or more entry points.

Therefore, a heretofore unaddressed need exists in the industry to address the aforementioned deficiencies and inadequacies.

SUMMARY OF THE INVENTION

This summary is provided to introduce concepts related to system and method for performing an analysis of entry points in a computing environment and the concepts are further described below in the detailed description. This summary is not intended to identify essential features of the claimed subject matter nor is it intended for use in determining or limiting the scope of the claimed subject matter.

In one implementation, a method for performing an analysis of a software application in a computing environment is disclosed. The method comprises accepting a compliable source code of the software application as an input data and processing the input data in order to obtain a comprehensive list of entry points. The processing further comprises generating at least one intermediate representation, from the input data in order to construct at least one informative structure for the software application. The processing further comprising identifying at least one relevant function from the at least one informative structure so constructed. Wherein the at least one relevant function represents a group of the entry points associated with the software application. The method further comprises generating a wrapper function to call all the identified entry points with at least one level call depth, thereby ensuring a non-deterministic sequence in view of a parameter list. The wrapper function is treated as a single entry point. The analysis is performed in a manner such that an analysis of the wrapper function enables the analysis of the single entry point and further enables an analysis of the identified group of the entry points leading to a complete analysis of the software application. The analysis of the wrapper function results in the analysis of the group of the entry points without performing an independent analysis of each entry point of the group of entry points. The steps of generating the at least one intermediate representations, identifying the at least one relevant functions, generating a wrapper function and analyzing the software application are performed by a processor using programming instructions stored in a memory.

In one implementation a system for performing an analysis of a software application in a computing environment is disclosed. The system comprises a processor and a memory. The memory is coupled to the processor. The processor configured to execute a set of programmed instructions stored in the memory. The memory comprises a receiving module to accept at least one source code of the software application as an input data and further obtain to a comprehensive list of the entry points. The memory further comprises a generating module configured to generate at least one intermediate representation from the input data in order to construct at least one informative structure for the software application. The memory further comprises an identification module to identify at least one relevant function from the at least one informative structure. The at least one relevant function represents a group of the entry points associated with the software application. The memory further comprises a wrapper generating module to generate a wrapper function which to call the identified group of the entry points with a call depth value of at least one level. The wrapper function is treated as a single entry point. The memory further comprises an analysis module providing an analysis of the wrapper function and enabling an analysis of the single entry point, enabling an analysis of all the identified group of the entry points leading to a complete analysis of the software application. The analysis of the wrapper function results in the analysis of the group of the entry points without performing an independent analysis of each entry point of the group.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION OF THE INVENTION

System and method for performing an analysis of entry points in a computing environment is described. The entry points in a software application are analyzed and are run sequentially at same time. In order to analyze the software application, all the entry points are considered as single entry point covering complete application.

The entry points to the software application are identified. Calling context of each and every entry point is identified and the calling context is maintained for analyzing the software application. Intermediate representation is generated from the application source code. The generated intermediate representation builds call hierarchy of the software application. Uncalled functions in the software application are identified and the uncalled functions act as super set of entry points wherein all uncalled functions are considered as entry points to the software application.

A wrapper function is generated by calling the entry points that are identified by maintaining the calling context. The wrapper function is analyzed by considering it as single entry point. The wrapper function analyzes all the entry points.

While aspects of described system and method for performing an analysis of entry points in a computing environment may be implemented in any number of different computing systems, environments, and/or configurations, the embodiments are described in the context of the following exemplary system.

Figure 1:
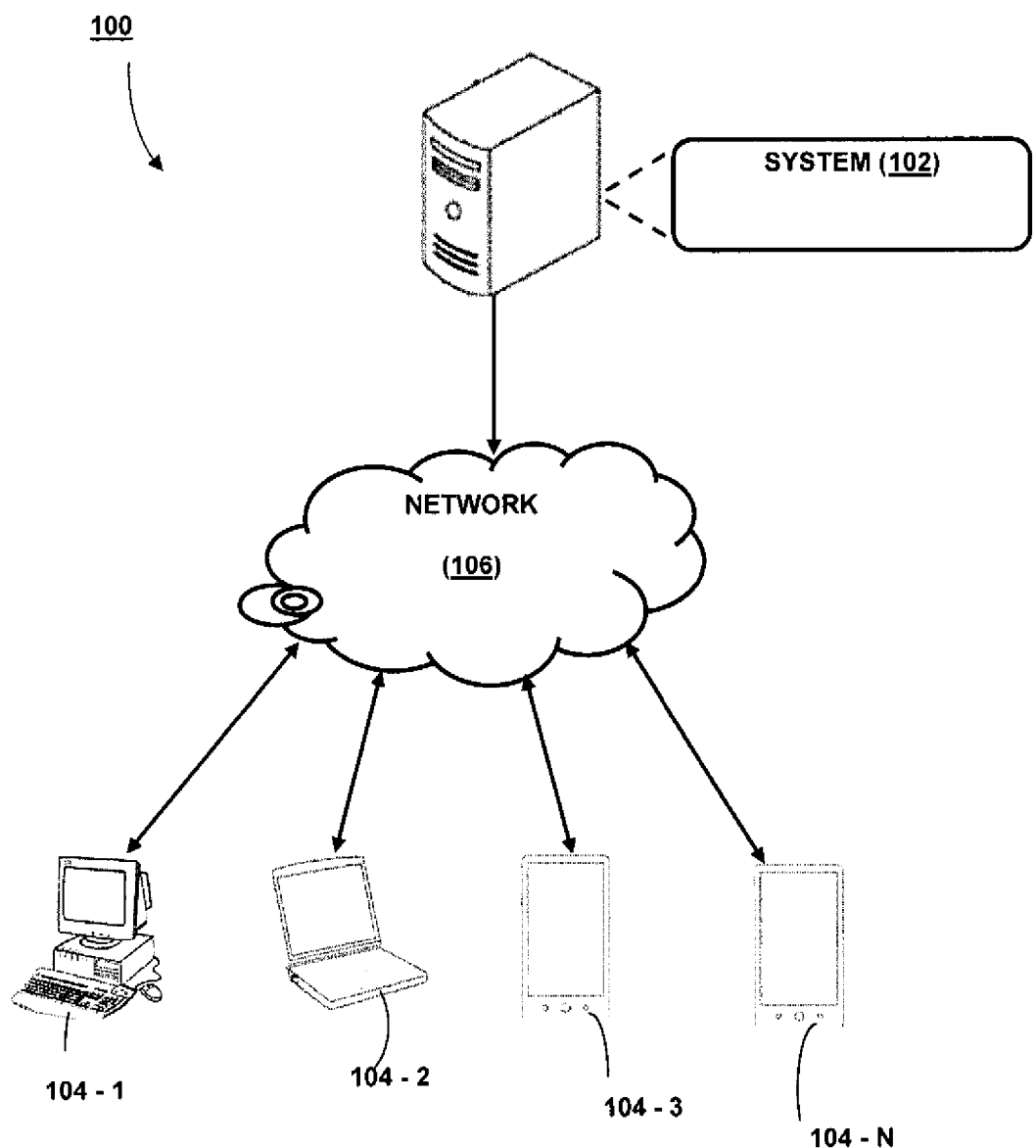
FIG. 1 illustrates a network implementation of a system for analyzing entry points in a computing environment is shown, in accordance with an embodiment of the present subject matter.

Referring now to FIG. 1, a network implementation 100 for performing an analysis of entry points is illustrated, in accordance with an embodiment of the present subject matter. In one embodiment, the system 102 identifies uncalled functions in the software application. The uncalled functions identified act as super set of entry points to the software application. All the entry points are wrapped as single entry point and analyzed.

Although the present subject matter is explained considering that the system 102 is implemented as an analysis tool on a server, it may be understood that the system 102 may also be implemented in a variety of computing systems, such as a laptop computer, a desktop computer, a notebook, a workstation, a mainframe computer, a server, a network server, and the like. It will be understood that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
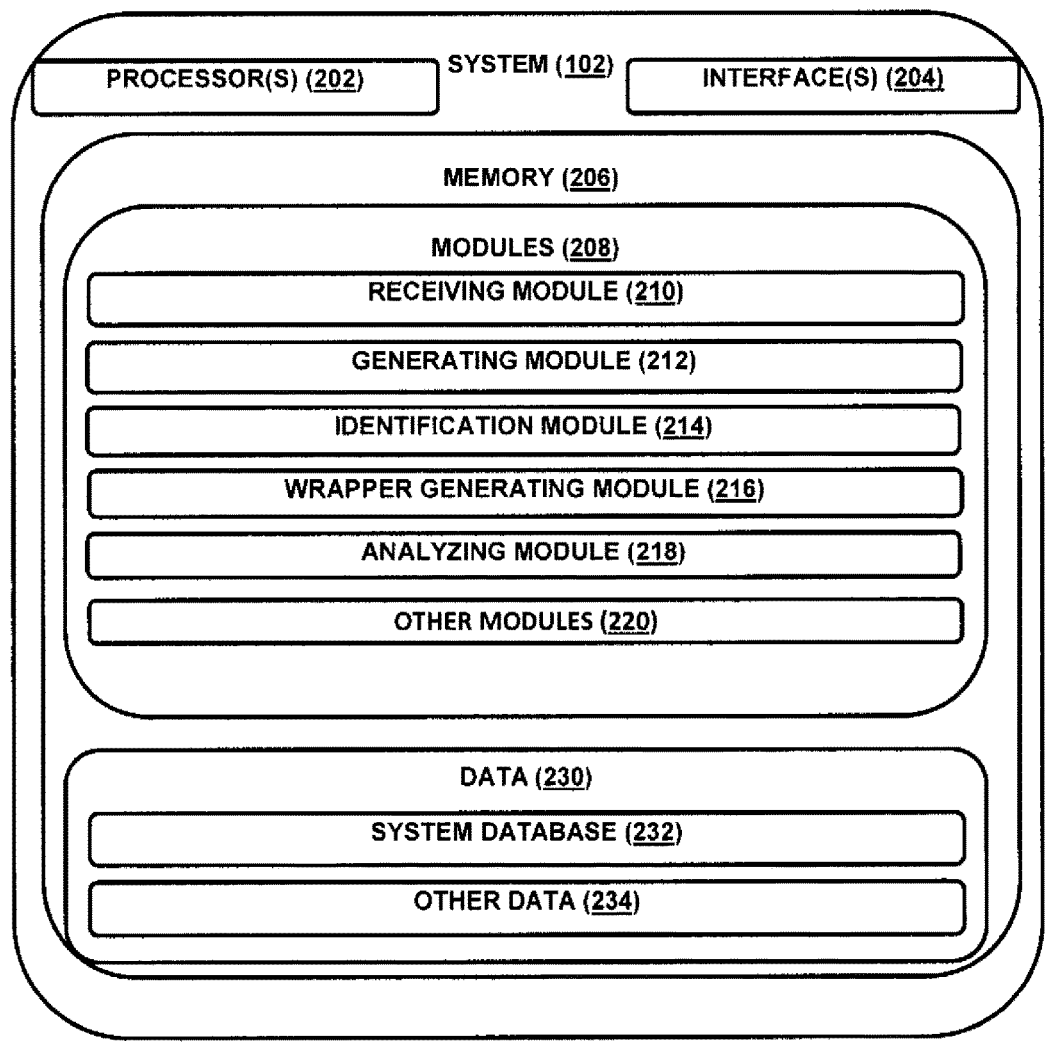
FIG. 2 illustrates the system performing an analysis of entry points in a computing environment, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a receiving module 210, a generating module 212, an identification module 214, a wrapper generating module 216, an analyzing module 218, and other modules 220. The other modules 220 may include programs or coded instructions that supplement applications and functions of the system 102.

The data 210, amongst other things, serves as a repository for storing data processed, received, and generated by one or more of the modules 208. The data 210 may also include a system database 232 and other data 130. The other data 130 may include data generated as a result of the execution of one or more modules in the other module 220.

In one implementation, at first, a user may use the client device 104 to access the system 102 via the I/O interface 204. The working of the system 102 may be explained in detail in FIGS. 2 and 3 explained below. The system 102 identifies entry points in the software application. The system 102 generates one or more intermediate representations from the software application to construct informative structure. The informative structure may further comprise of call hierarchy with respect to the software application. Further, the system 102 identifies uncalled functions which are considered as entry points to the software application. The entry points are wrapped and wrapper function is generated calling all the identified entry points with a call depth. The wrapper function is considered as a single entry point and analyzed.

Figure 3:
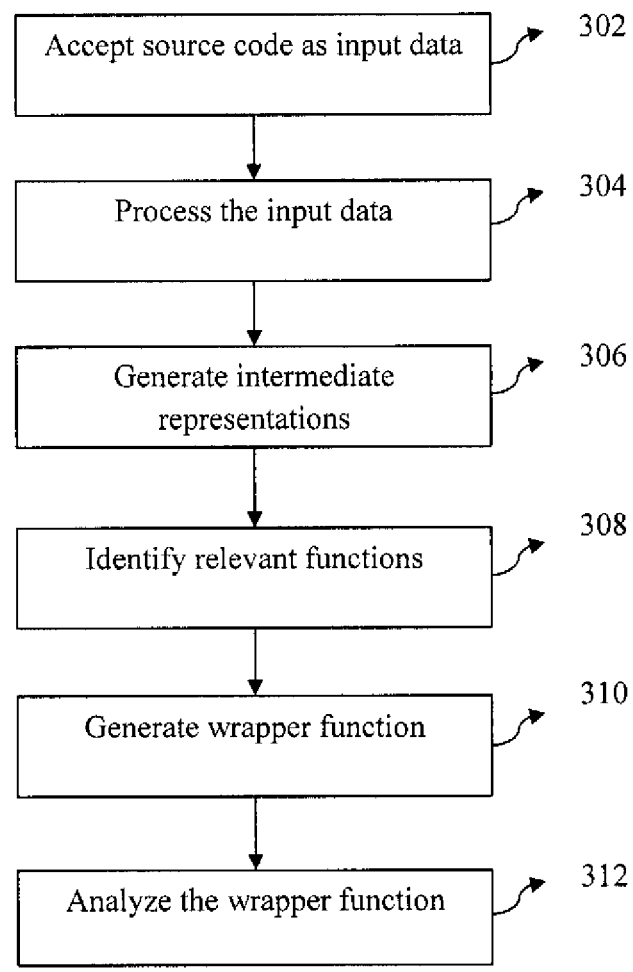
FIG. 3 illustrates a method for performing an analysis of entry points in a computing environment, in accordance with an embodiment of the present subject matter.

Referring to FIGS. 2 and 3, the system 102 comprises the processor 202 and the memory 206 coupled to the processor 202. The processor 202 is configured to execute a set of programmed instructions stored in the memory 206. The memory 206 comprises the receiving module 210, the receiving module 210 is configured to accept one or more entry points (step 302) associated with a software application as an input data. The receiving module 210 processes the input data in order to obtain a comprehensive list of entry points (step 304). In one embodiment, the input data may comprise a source code. Further, minimum call length value i.e., the call depth value is considered as one to include all the possible entry points.

The memory 206 comprises the generating module 212 configured to generate one or more intermediate representations (step 306) from the input data i.e., from the source code. Further, the generating module 212 facilitates in constructing one or more informative structure for the software application.

In one embodiment, the informative structure further comprises a call hierarchy with respect to the software application. The generating module 212 builds the call hierarchy of the software application. In another embodiment, by using the intermediate representations one or more call graphs are constructed and the call graphs are displayed in the form of call hierarchy.

In one embodiment of the disclosure, the memory 206 comprises the identification module 214 configured to identify one or more relevant functions (step 308) from the informative structure. In one embodiment, the relevant functions identified may include uncalled functions in the call hierarchy of the software application. By using the call hierarchy, the identification module 214 identifies the uncalled functions in the software application. Further, the relevant functions may represent a group of the entry points associated with the software application. Further, the group of entry points further comprises a super set of entry points. The super set of entry points may be indicative of the uncalled function that have been identified using the call hierarchy in the group of the entry points.

Figure 4:
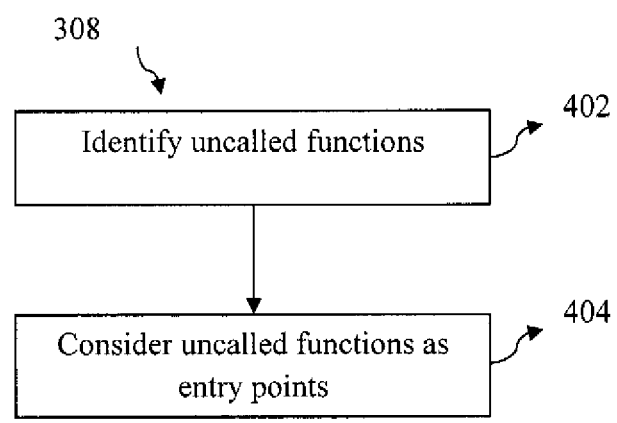
FIG. 4 illustrates a method for identifying relevant functions, in accordance with an embodiment of the present subject matter.

All the identified uncalled functions will be treated as entry points since the minimum call depth value is considered as one. Referring to FIGS. 3 and 4, step 308 further comprises identifying the uncalled functions (step 402) in the software application. The identified uncalled functions in the software application are considered as entry points (step 404).

Figure 5:
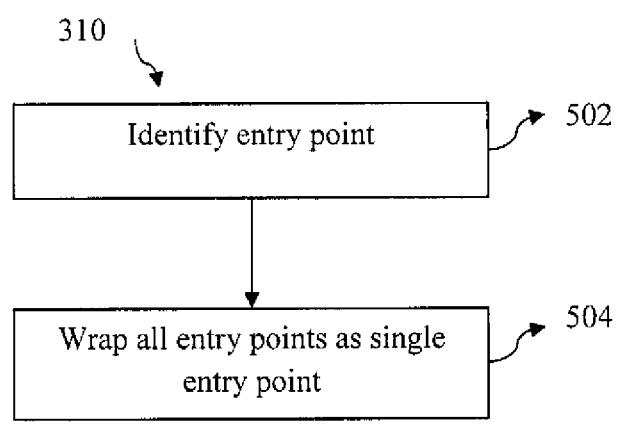
FIG. 5 illustrates a method for generating wrapper function, in accordance with an embodiment of the present subject matter.

In another embodiment of the disclosure, the memory 206 comprises the wrapper generating module 216 configured to generate wrapper function (step 310) with respect to each relevant function. Referring to FIG. 5, the wrapper generating module 216 identifies the entry points (step 502) in order to wrap the entry points. The wrapper generating module 216 wraps all the entry points into single entry point (step 504). The single entry point may include all the parameters associated with all of the entry points which are considered in the entire software application.

In another embodiment of the disclosure, the memory 206 comprises the analyzing module 218, the analyzing module performs analysis of the wrapper function by collecting parameters associated with the entry points. Further, static analysis is performed on the entry point which includes all the entry points in order to analyze the entire software application. The analyzing module 218 analyzes the single entry point which includes all the parameters associated with the entire entry points, which in turn analyze all of the entry points sequentially without requiring analyzing all the entry points individually.

Analysis of the wrapper function (step 312) comprises analyzing all of the entry points as the single entry point and analysis of the relevant function. Further, the analyzing module 218 analyzes of the relevant functions results in analysis of group of all of the entry points without performing an independent analysis of each entry point, thereby reducing overall time of analyzing the entire application with multiple entry points. In order to analyze the application, calling context of each and every identified entry point is maintained for accurate results. The calling context is maintained by sequentially executing multiple entry points without affecting analyzing of each entry point. The application code generated in the wrapper function calls all the entry points that are identified and analyzes the application code by wrapping the entry points in if and else conditions.

In another embodiment of the disclosure, generating the wrapper function by the wrapper generating module 216 calls all the identified entry points with minimum one level call depth, ensuring a non-deterministic sequence. Further, the call depth may include size of the call chain. For example, in case the function f1 is not calling any other function, the call depth is one. Further, in case function f2 is calling function f1, the call depth of f2 is two which indicates the length of call chain. Further, the wrapper function may be treated as a single entry point. The identified entry points are considered to be unique in the application. Further, the identified entry points are called by considering the parameter list or without considering the parameter list. For example, for the function f1 (a, b, c), specifies calling the function with parameters. The mangled function is used for linking. Further, for the function f1 ( ), specifies calling the function without considering the parameters. Here, only the function name is used for linking. The calling context of all the entry points is maintained at the time of generating wrapper functions to ensure an accurate analysis. Further, the wrapper function may be supplied externally to analyze the entry points.

The analysis of the wrapper function by the analyzing module 218 enables analysis of the single entry point and further enables the analysis of the identified entry points leading to a complete analysis of the application. The analysis of the wrapper function results in the analysis of the group of the entry points without performing an independent analysis of each entry point. Further, impact of one entry function is called followed by other entry function for all of the entry functions.

The system further ensures that the impact of one entry function being called after the other in all possible permutations going to infinite sequences.

In another embodiment of the disclosure, the software application is analyzed by the analyzing module 218 without generating the wrapper function and generating an input, the input consists of all the identified entry points.

Considering a default wrapper which is hard coded in analyzer, the internal wrapper may be used when no wrapper is required to be generated or supplied. For the hard coded wrapper, it may be assumed that only one of the entry function is called randomly at the beginning. The parameters may be provided with non-deterministic values to simulate all the scenarios. In another embodiment, global variables are considered to have values as per the declaration at the beginning of application run.

Figure 6:
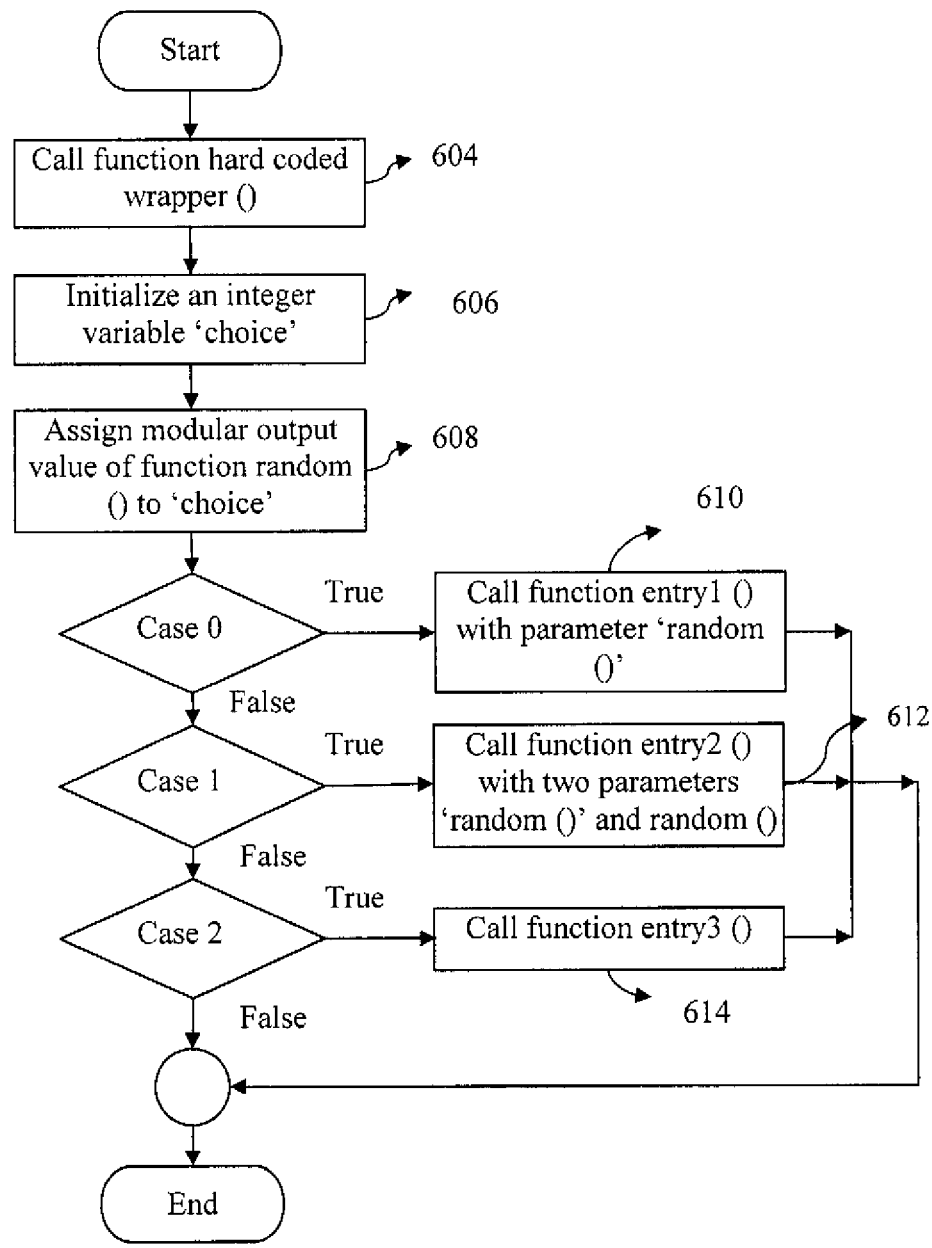
FIG. 6 illustrates a method for hard code wrapper function, in accordance with an embodiment of the present subject matter.

In one exemplary embodiment, hard code wrapper function is explained with the help of FIG. 6. Considering the hard code wrapper function and assuming that there are three entry functions such asentry1, entry2 and entry3. For the application code, entry1 may have one integer parameter, entry2 may have two integer parameters and entry3 may have no parameter.

At step 604, function hardcoded wrapper ( ) is called. At next step, 606 an integer variable 'choice' is initialized. At step 608, a modular output value of the function random ( ) is assigned to the variable 'choice'. Further, switch case is executed. In the next step 610, function entry 1( ) with input parameters of output of function random ( ) is executed, if case is 0. The next step 612 of calling function entry 2 ( ) with input parameters of outputs of function random ( ) is executed, is case is 1. In the next step 614, the function entry 3 ( ) is called if case is 2. The 'random' is a library function supplied with tool which generates a random integer number.

In another exemplary embodiment, in order to get the entry points with the minimum call depth of 1, consider a software application having following functions as source code.

---

Test1.c
void foo (int inp1, int inp2)
{
bar1( );
bar2( );
}
void bar1 ( )
{
bar3 ( );
}
void bar2 ( )
{
bar3 ( );
}
Test2.c
Voidfunc (int inp1)
{
bar2( );
}
void bar3 ( )
{ }
void func2 ( )
{
bar3 ( );
}
void bar4 (char c)
{
}

---

For the above sample of source code, the call hierarchy generated may be as shown below:

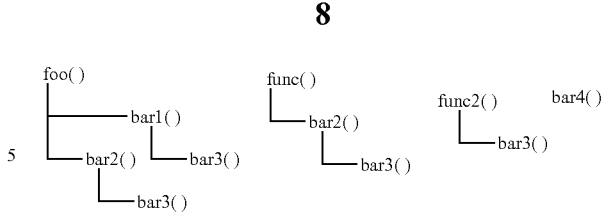

Here, the super-set of the entry points i.e. the set of uncalled functions={foo( ), func( ), func2( ), bar4( )}
The call depth of foo ( )=3
Call depth of func ( )=3
call depth of func2 ( )=2
Call depth of bar4 ( )=1
Further, for the required minimum call depth of 1, the set of entry points={foo ( ), func ( ), func2 ( ), bar4 ( )}
For the required minimal call depth of 2, the set of entry points={foo ( ), func ( ), func ( )}
For the required minimal call depth of 3, the set of entry points={foo ( ), func ( )}

Figure 7:
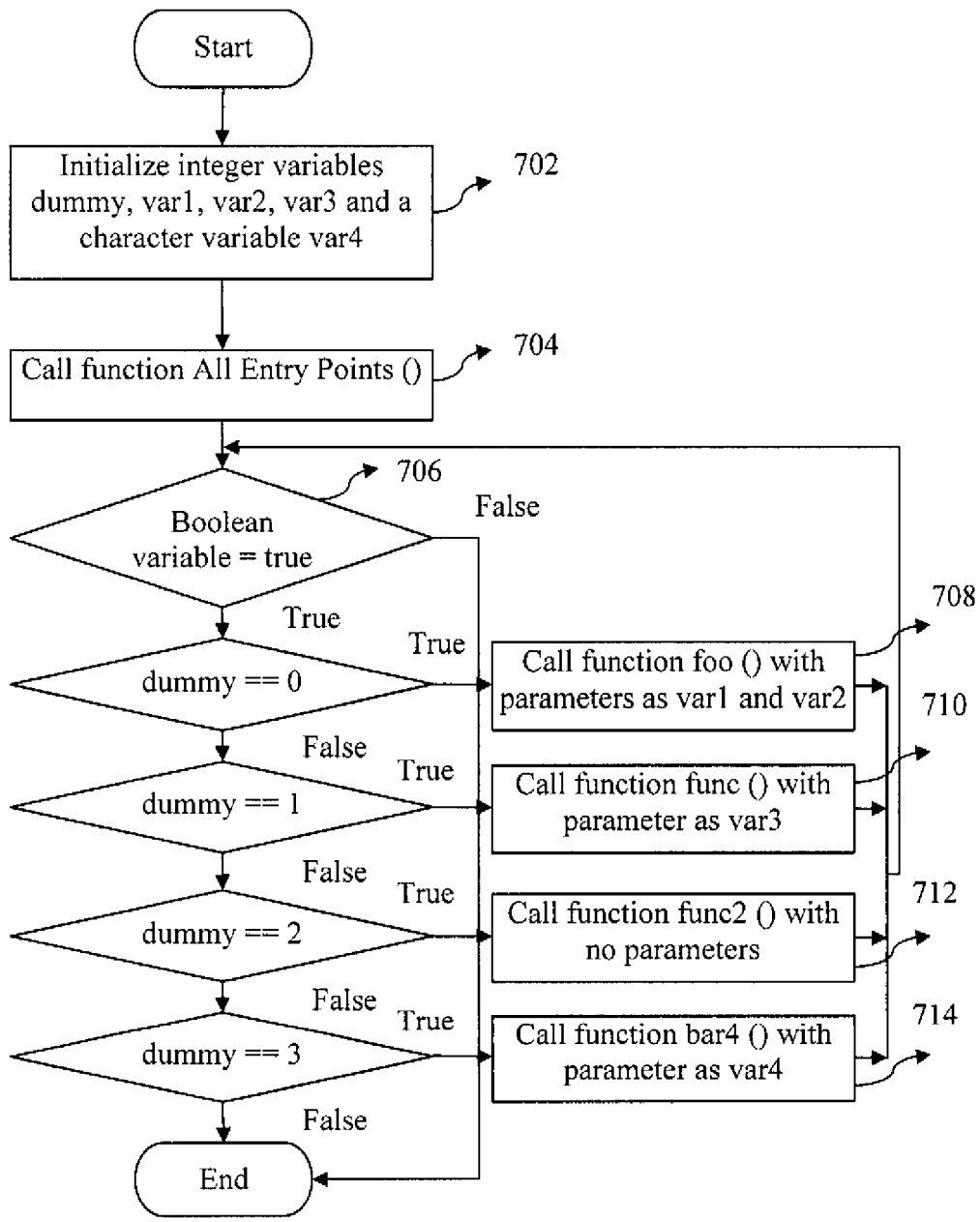
FIG. 7 illustrates application code containing one or more entry points, in accordance with an embodiment of the present subject matter.

In another exemplary embodiment, the application code containing one or more entry points is explained with the help of FIG. 7. For the above test case, there are four entry points: foo, func, func2, bar4. The C file generated by the wrapper function. In the step 702, integer variables dummy, var1, var2 var3, and a character variable are initialized. In the next step 704, the function all entry points ( ) is called. In the next step 706, while loop is initiated. In the next step 708, if dummy is 0, then the function foo ( ) with input parameters as var 1 and var 2 is called. In the next step 710, else if dummy 1, the function func ( ) with input parameters as var 3 is called. In the next step 712, else if dummy is 2, the function func2 ( ) is called. In the next step 714, else if dummy is 3, the function bar4 ( ) with parameters as var4 is called.

The wrapper generating module 216 collects all the entry points with their parameters associated in the software application. Further, the wrapper generating module 216 collects all the entry points with their parameters and declares the variables present in the parameter associated with the entry points.

It should be emphasized that the above-described embodiments of the present disclosure, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

We claim:
1. A method for performing an analysis of a software application in a computing environment, the method comprising:
receiving, by a processor, a source code of the software application as an input data;
generating, by the processor, an intermediate representation from the input data to construct an informative structure for the software application;
identifying, by the processor a group of the entry points associated with the software application, from the informative structure;
providing, by the processor, a wrapper function to call the entry points identified with one level call depth as a single entry point, based on a parameter list of the entry points in a non-deterministic sequence, wherein the wrapper function is generated by calling the identified group of the entry points by maintaining a calling context at the time of generating the wrapper function and wherein the wrapper function is treated as the single entry point, and wherein the single entry point comprises parameters associated with the entry points considered in the entire software application, wherein the call depth comprises size of call chain, and wherein the calling context is maintained by sequentially executing the group of entry points; and analyzing, by the processor, the wrapper function corresponding to the single entry point by collecting the parameters associated with the entry points such that the analysis of the single entry point leads to analysis of the entry points identified in the software application, thereby avoiding independent analysis of each entry point in the software application.

2. The method of claim 1, wherein the informative structure comprises a call hierarchy with respect to the software application.

3. The method claim 1, wherein the entry points are called considering the parameter list.

4. The method of claim 1, wherein the entry points are called without considering the parameter list.

5. The method of claim 1, wherein the wrapper function is provided using a default wrapper function and generating an input comprising the entry points with one level call depth.

6. The method of claim 2, wherein the wrapper function further comprises uncalled functions in the call hierarchy.

7. The method of claim 1, wherein the entry points comprises a super set of entry points.

8. A system for performing an analysis of a software application in
    a computing environment, the system comprising:
    a processor;
    a memory coupled to the processor, the processor configured to execute programmed instructions stored in the memory, to:
        receive a source code of the software application as an input data;
        generate an intermediate representation from the input data to construct an informative structure for the software application;
        identify a group of the entry points associated with the software application, from the informative structure;
        provide a wrapper function to call the entry points identified with one level call depth as a single entry point, based on a parameter list of the entry points in a non-deterministic sequence, wherein the wrapper function is generated by calling the identified group of the entry points by maintaining a calling context at the time of generating the wrapper function and wherein the wrapper function is treated as the single entry point, and wherein the single entry point comprises parameters associated with the entry points considered in the entire software application, wherein the call depth comprises size of call chain, and wherein the calling context is maintained by sequentially executing the group of entry points; and
        analyze the wrapper function corresponding to the single entry point by collecting the parameters associated with the entry points such that analysis of single entry point leads to analysis of the entry points identified in the software application, thereby avoiding independent analysis of each entry point in the software application.

9. The system of claim 8, wherein the informative structure comprises a call hierarchy with respect to the software application.

10. The system claim 8, wherein the entry points are called considering a parameter list.

11. The system of claim 8, wherein the wrapper function is provided using a default wrapper function with an input comprising the entry points with one level call depth.

12. The system of claim 8, wherein the wrapper function comprises uncalled functions in the call hierarchy.

13. The system of claim 8, wherein the entry points comprises a super set of entry points.

* * * * *